United States Patent [19]

Ohren et al.

[11] 4,019,999

[45] Apr. 26, 1977

[54] SPRAY-DRIED GRANULAR DETERGENT CONTAINING ALUMINOSILICATE, SILICATE, AND PYROPHOSPHATE

[75] Inventors: Tom H. Ohren; Gary W. Kingry, both of Cincinnati, Ohio

[73] Assignee: The Procter & Gamble Co., Cincinnati, Ohio

[22] Filed: July 23, 1975

[21] Appl. No.: 598,292

[52] U.S. Cl. .............................. 252/140; 252/89 R; 252/131; 252/135; 252/174; 252/179; 252/531; 252/532; 252/534; 252/539

[51] Int. Cl.$^2$ .................... C01B 33/28; C11D 3/06; C11D 3/12; C11D 11/02

[58] Field of Search .............. 252/89, 99, 131, 135, 252/179, 174, 140, 531, 532, 534, 539

[56] References Cited

UNITED STATES PATENTS

| | | | |
|---|---|---|---|
| 2,904,513 | 9/1959 | Metcalf | 252/135 |
| 3,896,056 | 7/1975 | Benjamin | 252/539 |
| 3,929,678 | 12/1975 | Laughlin | 252/526 |
| 3,932,316 | 1/1976 | Sagel | 252/532 |
| 3,985,669 | 10/1976 | Krummel | 252/116 |

FOREIGN PATENTS OR APPLICATIONS

| | | | |
|---|---|---|---|
| 2,422,655 | 11/1974 | Germany | 252/131 |
| 2,433,485 | 2/1975 | Germany | 252/131 |
| 7,511,342 | 3/1976 | Netherlands | 252/140 |

*Primary Examiner*—Dennis L. Albrecht
*Attorney, Agent, or Firm*—Forrest L. Collins; Robert B. Aylor; Thomas H. O'Flaherty

[57] ABSTRACT

A spray-dried granular detergent composition is prepared containing an alkali metal silicate, a particular aluminosilicate, and an alkali metal orthophosphate or pyrophosphate with a limited range of total-free moisture contents. The compositions of the present invention are very effective in cleaning despite the low levels of total phosphate present.

16 Claims, No Drawings

SPRAY-DRIED GRANULAR DETERGENT CONTAINING ALUMINOSILICATE, SILICATE, AND PYROPHOSPHATE

BACKGROUND OF THE INVENTION

1. The present invention relates to detergent products useful for laundering fabrics.

Description of the Art.

For many years persons in the detergent arts have attempted to successfully incorporate aluminosilicates into detergent compositions intended for home laundering. For instance Guernsey received U.S. Pat. No. 1,419,625 on June 13, 1922 for a detergent product containing a hydrated condensate of alumina, silica, and an alkali metal oxide.

More recently, Corkill et al., in U.S. Pat. application Ser. No. 450,266 filed Mar. 11, 1974, described hydrated aluminosilicates having the formula $$Na_{12}(AlO_2{\cdot}SiO_2)_{12}{\cdot}x\ H_2O$$

wherein $x$ is an integer of from about 20 to about 30 as detergency builders. The application of Corkill et al also discloses that additional co-builders may be present at from about 5% to about 50% by weight. Examples of materials so used include sodium silicate or sodium pyrophosphate. The Corkill et al. application further states that an essential feature of that invention is that the aluminosilicates must contain from 10 to 28% by weight water. The examples in the Corkill et al. application state that the granules are prepared by conventional spray drying.

Further discussions relating to aluminosilicates in detergent products are found in United States patent application Ser. No. 479,951 to Krummel et al. filed June 17, 1974 now U.S. Pat. No. 3,985,669. In Krummel et al. it is stated that alkali metal silicates having a molar ratio of $SiO_2$ to the alkali metal oxide in the range of from 0.5:1 to about 4:1 at a level of from about 0.5% to about 3% by weight are employed with the aluminosilicate. The placing of the upper limit of 3% on the alkali metal silicate content is stated to be necessary to avoid deposition upon fabrics caused by the interaction of the detergent, the aluminosilicate, and the alkali metal silicate. This fabric deposition is recognized by the consumer as a white floc and is particularly evident on dark colored fabrics.

Krummel et al. discloses in the examples that the aluminosilicate and alkali metal silicate detergent products are spray dried to about 10% moisture. It is further stated that detergent products containing aluminosilicates and alkali metal silicates have been observed to have increased fabric deposition as the alkali metal silicate content or the silicate ratio of the product is raised. It is also been observed that when the moisture content of products such as those claimed by Krummel et al. is decreased, the fabric deposition becomes much more severe. The examples in Krummel et al. for products having a moisture content between 9.9and 10.2% by weight of the finished product.

United States patent application Ser. No. 587,445 filed by Benson et al. on June 16, 1975 discloses detergent compositions containing alkali metal pyrophosphates, alkali metal silicates and optionally aluminosilicates. Benson et al. describes a composition in Example VIII thereof as containing 3% or less of an alkali metal silicate. The application of Benson et al. is directed toward increasing the effectiveness of alkali metal pyrophosphate as detergency builders through precipitation rather than sequestration of calcium ions in the wash solution.

The difficulties encountered in attempting to achieve overall consumer acceptance in products containing alkali metal phosphates, alkali metal silicates, and aluminosilicates have been numerous. For example, it is desirable to limit the phosphate content of detergent products because of the suspected eutrophication properties attributed to the phosphate. However, products totally void of phosphates do not perform well in cleaning because of the high degree of calcium and magnesium control which is exhibited by the phosphates. Moreover, in wash solutions the presence of phosphates is desirable to peptize and suspend various types of soil during the wash cycle. The presence of even small quantities of alkali metal phosphates also contribute greatly to the processing and stability of spray-dried granules. That is, the presence of the phosphates allow for the formation of crisp free-flowing granules and then serve to maintain the granules in a crisp free-flowing state during storage of the product.

Alkali metal silicates are necessary components in detergent products from the standpoint that they minimize the tendency of other detergent components to corrode washing machine surfaces. The alkali metal silicates are also desirable components in spray-dried detergent granules in that they aid in crutcher mix processing and also aid in maintaining crisp free-flowing granules. Moreover, as disclosed in the Benson et al. application, supra, the interaction of silicates and pyrophosphates can under the proper circumstances result in an extremely effective detergent builder system.

The inclusion of the specific aluminosilicates of the present invention in detergent compositions is necessary to minimize the amount of phosphate required to achieve water hardness control. The aluminosilicates of the present invention are also of interest because of their ability to lessen the deposition of the phosphate salts on exposed machine surfaces.

To achieve the foregoing, however, requires a delicate balance of the positive aspects with the negatives involved. As was previously stated the aluminosilicates and alkali metal silicates when present in the same product have a pronounced tendency to aggregate through bridging of the aluminosilicate molecules. This aggregation is evidenced by large amounts of insoluble floc which is deposited upon the laundered fabrics. Aside from the unsightly deposition on the fabrics, the interaction of the silicate and aluminosilicate diminishes the ability of the latter to control water hardness. This deposition phenomena has been observed to be a function of the ratio and level of silicate, the level of the aluminosilicate, and the amount of moisture in a detergent product consisting essentially of these compounds.

Conversely, to make pyrophosphate a much more effective detergent builder the detergent product must contain the alkali metal silicate at a high level and ratio and must be dried to a very low moisture level.

The antagonistic nature of the components of the present invention make it exceedingly difficult to predict how a product should be formulated to avoid the aforementioned difficulties. Much of the effort which has gone into the present invention could be avoided if one were satisfied with admixing the silicate, the alkali metal phosphate, the aluminosilicate, and the detergent component. However, such a proposal is not practical from the standpoint of attempting to homogeneously mix and package the components. Moreover, the finely divided state of the aluminosilicate would segregate from the remaining components if dry mixed into a detergent product. Further, to achieve the precipitation of calcium ions by the pyrophosphate, the metal silicate must be dried in the presence of the detergent component. It is also realized that storage facilities for each separate component are expensive to build and maintain. It is therefore noted that to be effective in cleaning and in ease of manufacture the product must be spray dried into the form of homogeneous granules.

It is an object of the present invention to provide a spray-dried granular detergent product containing an alkali metal orthophosphate or pyrophosphate, an alkali metal silicate, and an aluminosilicate builder.

It is a further object of the present invention to provide an aluminosilicate containing detergent product of low free moisture content without experiencing the negatives of the loss of calcium ion exchange capacity and the attendant fabric deposition.

It is yet a further object of the present invention to provide an aluminosilicate detergency builder in combination with an alkali metal silicate in a form such that the reaction of the aforementioned components is lessened.

Another object of the present invention is to incorporate into the composition an alkali metal pyrophosphate or orthophosphate detergency builder such that the phosphate precipitates rather than sequesters the calcium present.

It is still yet a further object of the present invention to utilize the aluminosilicate in an amount sufficient to lessen buildup on the exposed machine surfaces of the reaction product of the calcium ions and the phosphate salts.

A further object of this invention is to prepare a spray-dried granular detergent product which is free-flowing and resistant to caking.

It has now been discovered that a spray-dried granule which exhibits a high degree of building capacity for both the aluminosilicate and the alkali metal phosphate has been prepared. The water-hardness is controlled through ion exchange by the aluminosilicate and through precipitation and sequestration by the alkali metal phosphate. This granule is further characterized in having a low level of insolubles as measured by fabric deposition tests. Moreover, the granules of the present invention are free flowing and have reduced caking tendency.

Throughout the specification and claims percentages and ratios are by weight and temperatures are in degrees Fahrenheit unless otherwise indicated.

SUMMARY OF THE INVENTION

A spray-dried granular detergent product comprising:

a. from about 1% to about 40% by weight of an organic detergent component selected from the group consisting of anionic, nonionic, zwitterionic, and ampholytic detergents and mixtures thereof;

b. from about 3% to about 25% by weight of a water insoluble crystalline aluminosilicate ion exchange material of the formula $$Na_{12}[AlO_2 \cdot SiO_2]_{12} \cdot x\ H_2O$$

wherein $x$ is an integer of from about 20 to about 30;

c. from about 5% to about 35% by weight of a phosphate builder selected from the group consisting of alkali metal pyrophosphates and orthophosphates and mixtures thereof;

d. from about 5% to about 25% by weight of an alkali metal silicate having the weight ratio $SiO_2$:$M_2O$ of from about 2.0:1 to about 4.0:1 wherein M is an alkali metal; said product having a total free moisture content of from about 3.5% to about 7% by weight of the composition.

DETAILED DESCRIPTION OF THE INVENTION

A. Alkali Metal Phosphate

The first component of the present invention is an alkali metal phosphate salt selected from the group consisting of pyrophosphates and orthophosphates and mixtures thereof. When used individually or in combination with one another these phosphate salts are present in the composition at a level of from about 5% to about 35%, preferably at from about 10% to about 25% by weight of the composition. While any alkali metal cation may be used in the present invention the sodium salt is preferred.

Under ordinary conditions pyrophosphates will sequester calcium ions on a molar basis (1:1), however, in the present invention the dicalcium pyrophosphate precipitate (2:1) is rapidly formed thus allowing more calcium control while lowering the phosphate content. While orthophosphates are known to precipitate calcium they do so to a much greater rate and extent in the present invention.

The preferred alkali metal phosphate is pyrophosphate. Both the pyrophosphate and orthophosphate anion precipitate calcium ion from solution, however, the orthophosphate salts unlike pyrophosphate do not have the capacity for the sequestration of magnesium ions. In a given composition of the present invention it is thus desirable to include a slight excess of the pyrophosphate for magnesium control over and above the stoichiometric quantities of pyrophosphate and aluminosilicate required for control of the free calcium. The slight excess of pyrophosphate is also desirable from the standpoint of its ability to peptize and suspend many types of soils in the wash solution. Both the alkali metal pyrophosphates and alkali metal orthophosphates are readily available from commercial sources.

A further point of interest in the utilization of alkali metal pyrophosphate salts is their availability in either the anhydrous or decahydrate form. It is preferred for purposes of the present invention that the alkali metal pyrophosphates when utilized be present in the anhydrous form. The use of the anhydrous form aids in crutcher mix processing and also requires less energy in the drying operation.

When mixtures of alkali metal orthophosphates and pyrophosphates are utilized in the present invention the weight ratio of the orthophosphate to the pyrophosphate is from about 4:1 to about 1:1.5, preferably from about 1.5:1 to about 1:1.5. The advantage of using mixtures of ortho and pyrophosphates is that a whiteness maintenance negative is overcome. Products built with pyrophosphate having trace amounts of orthophosphate present suffer from a whiteness maintenance deficiency. Whiteness maintenance is a measure of the amount of soil which will be deposited on fabrics from the dirty wash water.

If desired the alkali metal phosphate may be introduced into the slurry in the form of its acid salt and then neutralized, e.g., with sodium carbonate. Sodium carbonate is also useful as a diluent but its exclusion from the composition lessens caking. When used, the sodium carbonate is present at from about 5% to about 25% by weight.

B. Alkali Metal Silicate

The second component of the present invention is an alkali metal silicate preferably the sodium salt thereof. Alkali metal silicates are defined in a ratio of $SiO_2:M_2O$ wherein M is an alkali metal. The alkali metal silicates may be purchased in either liquid or granular form. For convenience in the present invention slurries of alkali metal silicates are used to avoid having to dissolve the dried form in the crutcher mix.

The alkali metal silicates of the present invention have a weight ratio of $SiO_2:M_2O$ of from about 2.0:1 to about 4.0:1, preferably from about 2.4:1 to about 3.75:1. The higher ratio silicates are desirable from the standpoint that they have a more pronounced tendency upon drying to undergo homopolymerization. The exact function of the silicate is not fully understood, however, it is known that in the present invention that the ratio of free moisture in the product to the amount of $SiO_2$ present is extremely significant in obtaining the precipitated phosphate in the wash solution.

While not wishing to be bound by any particular theory it is believed that the free moisture content of the product as hereinafter defined is obtained through the selective dehydration of the silicate which occurs at a much more rapid rate than does the dehydration of the aluminosilicate. Thus it is believed that in the spray-dried granules that more of the moisture is associated with the aluminosilicate and to a lesser extent with each of the remaining components.

The amount of alkali metal silicate in the spray-dried granule is from about 5% to about 25%, preferably from about 7% to about 15% by weight.

C. The Aluminosilicate

The particular aluminosilicate of the present invention has the formula $$Na_{12}[AlO_2 \cdot SiO_2]_{12} \cdot x\ H_2O$$

wherein *x* is an integer from about 20 to about 30. The aluminosilicates within the foregoing hydration limits and which have a particle size range of from about 0.1 micron to about 100 microns exhibit a calcium ion exchange capacity of about 200 mg. eq. $CaCO_3$/g. The aluminosilicate of the present invention has an ion exchange rate with calcium of about 2 grains of calcium ion per gallon per minute per gram. While the particle size range of the aluminosilicates of the present invention between 0.1 micron to about 100 microns, it is preferred that the particle size range be from about 0.2 micron to about 10 microns. The preferred particle size range allows rapid removal in sewage treatment facilities while at the same time providing for adequate dispersion from the granule into the wash solution. Aluminosilicates in the preferred particle size range are also less likely to be agglomerated by the silicate.

The amount of the aluminosilicate present in the spray-dried granules of the present invention is from about 3% to about 25%, preferably from about 10% to about 20% by weight of the aluminosilicate solids. To lessen the aforementioned deposition of phosphate salts on machine surfaces, the weight ratio of the phosphate to the aluminosilicate is less than 1:1, preferably from about 1:3 to about 9:10. When pyrophosphate is the only inorganic lower phosphate builder present and the aluminosilicate is used in the above ratios, the aforementioned whiteness maintenance negative is lessened.

The aluminosilicates herein are prepared according to the following procedure:

a. dissolve sodium aluminate ($Na\ AlO_2$) in water to form a homogeneous solution having a concentration of $Na\ AlO_2$ of about 16.5% (preferred);

b. add sodium hydroxide to the sodium aluminate solution of step (a) at a weight ratio of $NaOH:Na\ AlO_2$ of 1:1.8 (preferred) and maintain the temperature of the solution at about 50° C until all the NaOH dissolves and a homogeneous solution forms;

c. add sodium silicate ($Na_2SiO_3$ having an $SiO_2:Na_2O$ weight ratio of 3.2 to 1) to the solution of step (b) to provide a solution having a weight ratio of $Na_2SiO_3$:NaOH of 1.14:1 and a weight ratio of $Na_2SiO_3:NaAlO_2$ of 0.63:1; and d. heat the mixture prepared in step (c) to about 90°–100° C and maintain at this temperature range for about 1 hour.

In a preferred embodiment, the mixture of step (c) is cooled to a temperature below about 25° C, preferably in the range from 17° to 23° C, and maintained at that temperature for a period from about 25 hours to about 500 hours, preferably from about 75 hours to about 200 hours.

The mixture resulting from step (d) is cooled to a temperature of about 50° C and thereafter filtered to collect the desired aluminosilicate solids. If the low temperature (<25° C) crystallization technique is used, then the precipitate is filtered without additional preparatory steps. The filter cake can optionally be washed free of excess base (deionized water wash preferred to avoid cation contamination). The filter cake is dried to a moisture content of 18–22% by weight using a temperature below about 150° C to avoid excessive dehydration. Preferably, the drying is performed at 100°–105° C.

Following is a typical pilot-plant scale preparation of the aluminosilicates herein.

PREPARATION OF ALUMINOSILICATE BUILDER

| Component | Pounds (As Is) | Pounds (Anhydrous) | Water | Wt. % Of Total |
|---|---|---|---|---|
| $NaAlO_2$ | 57.72 | 49.454 | 8.27 | 16.40 (Anh.) |
| Sodium Silicate (3.2:1 $SiO_2:Na_2O$) | 82.52 | 30.945 | 51.57 | 10.26 (Anh.) |
| NaOH | 54.96 | 27.304 | 27.66 | 9.05 (Anh.) |
| $H_2O$ (deionized) | 106.40 | | 106.40 | 64.29 |

The sodium aluminate was dissolved in the water with stirring and the sodium hydroxide added thereto. The temperature of the mixture was maintained at 50° C and the sodium silicate was added thereto with stirring. The temperature of the mixture was raised to 90°–100° C and maintained within this range for 1 hour with stirring to allow formation of a synthetic aluminosilicate ion exchange material having the formula $Na_{12}(AlO_2.SiO_2)_{12}{\cdot}27\ H_2O$. The mixture was cooled to 50° C, filtered, and the filter cake washed twice with 100 lbs. of deionized water. The case was dried at a temperature of 100°–105° C to a moisture content of 18–22% by weight to provide the aluminosilicate builder material. This synthetic aluminosilicate ion exchange material is known under the commercial denomination ZEOLITE A; in the dehydrated form it can be used as a molecular sieve and catalyst carrier.

The aluminosilicates prepared in the foregoing manner are characterized by a cubic crystal structure and may additionally be distinguished from other aluminosilicates on the basis of the X-ray powder diffraction pattern. X-ray analysis data for the above synthetic aluminosilicate were obtained on PHILIPS ELECTRONICS X-ray diffraction equipment. This included a nickel filtered copper target tube at about 1100 watts of input power. Scintillation detection with a strip chart recorder was used to measure the diffraction from the spectrometer. Calculation of the observed d-values was obtained directly from the spectrometer chart. The relative intensities were calculated with Io as the intensity of the strongest line or peak. The synthetic aluminosilicate ion exchange material having the formula $Na_{12}[(AlO_2)_{12}.(SiO_2)_{12}].27\ H_2O$ prepared as described hereinbefore had the following x-ray diffraction pattern:

| d | I/Io | d | I/Io |
|---|---|---|---|
| 12.3 | 100 | 2.15 | 10 |
| 8.67 | 70 | 2.11 | 4 |
| 7.14 | 35 | 2.09 | 4 |
| 6.35 | 1 | 2.06 | 10 |
| 5.50 | 25 | 1.92 | 8 |
| 5.04 | 2 | 1.90 | 4 |
| 4.36 | 6 | 1.86 | 2 |
| 4.11 | 35 | 1.84 | 4 |
| 3.90 | 2 | 1.76 | 2 |
| 3.71 | 50 | 1.74 | 14 |
| 3.42 | 16 | 1.69 | 6 |
| 3.29 | 45 | 1.67 | 2 |
| 3.08 | 2 | 1.66 | 2 |
| 2.99 | 55 | 1.63 | 4 |
| 2.90 | 10 | | |
| 2.76 | 12 | | |
| 2.69 | 4 | | |
| 2.62 | 20 | | |
| 2.52 | 6 | | |
| 2.47 | 4 | | |
| 2.41 | 1 | | |
| 2.37 | 4 | | |
| 2.29 | 1 | | |
| 2.25 | 4 | | |
| 2.18 | 8 | | |

The above diffraction pattern substantially corresponds to the pattern of ASTM powder diffraction card file No. 11–590. Although completely hydrated aluminosilicate ion exchange materials are preferred herein, it is recognized that the partially dehydrated aluminosilicates having the general formula given hereinbefore are also excellently suitable for rapidly and effectively reducing the water hardness during the laundering operation. Of course, in the process of preparing the instant aluminosilicate ion exchange material, reaction-crystallization parameter fluctuations can result in such partially hydrated materials. As pointed out previously, aluminosilicates having less than 10% (e.g. 6%) water do not function effectively for the intended purpose in laundering context. The suitability of particular partially dehydrated water-insoluble aluminosilicates for use in the compositions of this invention can easily be asserted and does only involve routine testing as, for example, described herein (Ca-ion exchange capacity; rate of exchange).

The ion exchange properties of the aluminosilicates herein can conveniently be determined by means of a calcium ion electrode. In this technique, the rate and capacity of $Ca^{++}$ uptake from an aqueous solution containing a known quantity of $Ca^{++}$ ion is determined as a function of the amount of aluminosilicate ion exchange material added to the solution.

The foregoing procedure for preparing the aluminosilicate ion exchange materials herein can be modified in its various process steps, as follows.

Step (a) can be modified by using solution concentrations of $NaAlO_2$ of from 5% to 22% by weight; the optimum concentration is 16% to 16.5%. Step (b) can be modified by deletion of the NaOH. Sodium hydroxide is not required to form the aluminosilicates herein but its use is preferred to initiate the reaction and to maintain reaction efficiency. Step (b) can be further modified by use of temperatures within the range of from about 30° C to about 100° C; 50° C is preferred. Step (c) can be modified by varying the ratio of aluminate to silicate. In order to satisfy the 1:1 $AlO_2$:$SiO_2$ stoichiometry requirements of a specifically preferred species in the final product, it is necessary to provide in that particular case at least a 1:1 mole ratio of $AlO_2$:$SiO_2$ (based on $NaAlO_2$ and $Na_2SiO_3$) in the mix. In that latter event, it is highly preferred to employ an excess of $NaAlO_2$, inasmuch as excess $NaAlO_2$ has been found to promote the rate and efficiency of the formation reaction of aluminosilicates having a 1:1 molar ratio of $AlO_2$:$SiO_2$.

Step (d) can be modified to employ temperatures from 50° C to 110° C at ambient pressures; 90° to 100° C is optimal. Of course, higher temperatures can be employed if high pressure equipment is used to prepare the aluminosilicates. When the high-temperature (90°–100° C) crystallization technique is used, step (d) will normally require a formation reaction time of about 1 to 3 hours. As noted hereinbefore, an additional possibility for preparing the ion exchange materials resides in modifying step (d) by cooling the mixture of step (c) to a temperature below about 25° C, preferably in the range from 17°–23° C, and maintaining said mixture at that temperature for a period from about 25 hours to 500 hours, preferably from about 75 hours to about 200 hours.

Following the formation of the aluminosilicates by the foregoing procedure, the materials are recovered and dried. When employed as ion exchange builders, the aluminosilicates must be in a highly hydrated form, i.e. 10 to 28%, preferably 10 to 22%, by weight of water. Accordingly, drying of the aluminosilicates must be carried out under controlled temperature conditions. Drying temperatures of from about 90° C to about 175° C can be employed. However, at drying temperatures from about 150° C to about 175° C, the less highly hydrated materials (ca. 10% $H_2O$) are obtained. Accordingly, it is preferred to dry the aluminosilicates at 100° C to 105° C, whereby the optimum builder materials containing 18 to 22% of water are secured. At these latter temperatures, the stability of the preferred 27-hydrate form of the aluminosilicate is independent of drying time.

D. Detergent Component

Preferably the detergent component of the present invention is a water-soluble salt of: an ethoxylated sulfated alcohol with an average degree of ethoxylation of about 1 to 4 and an alkyl chain length of about 14 to 16; tallow ethoxy sulfate; tallow alcohol sulfates; an alkyl benzene sulfonate with an average alkyl chain length between 11 and 13, preferably 11.2 carbon atoms; a $C_6$–$C_{20}$ $\alpha$-sulfocarboxylic acid or ester thereof having 1 to 14 carbon atoms in the alcohol radical; a $C_8$–$C_{24}$ paraffin sulfonate; a $C_{10}$–$C_{24}$ $\alpha$-olefin sulfonate or mixtures thereof; or other anionic sulfur-containing surfactant. Such preferred detergents are discussed below.

An especially preferred alkyl ether sulfate detergent component of the present invention is a mixture of alkyl ether sulfates, said mixture having an average (arithmetic mean) carbon chain length within the range of about 12 to 16 carbon atoms, preferably from about 14 to 15 carbon atoms, and an average (arithmetic mean) degree of ethoxylation of from about 1 to 4 moles of ethylene oxide, preferably from about 2 to 3 moles of ethylene oxide.

Specifically, such preferred mixtures comprise from about 0 to 10% by weight of mixture of $C_{12-13}$ compounds, from about 50 to 100% by weight of mixture of $C_{14-15}$ compounds, and from about 0 to 45% by weight of mixture of $C_{16-17}$ compounds, and from about 0 to 10% by weight of a mixture of $C_{18-19}$ compounds. Further, such preferred alkyl ether sulfate mixtures comprise from about 0 to 30% by weight of mixture of compounds having a degree of ethoxylation of 0, from about 45 to 95% by weight of mixture of compounds having a degree of ethoxylation from 1 to 4, from about 5 to 25% by weight of mixture of compounds having a degree of ethoxylation from 5 to 8, and from about 0 to 15% by weight of mixture of compounds having a degree of ethoxylation greater than 8. The sulfated condensation products of ethoxylated alcohols of 8 to 24 alkyl carbons and with from 1 to 30, preferably 1 to 4 moles of ethylene oxide may be used in place of the preferred alkyl ether sulfates discussed above.

Another class of detergents which may be used in the present invention includes the water-soluble salts, particularly the alkali metal, ammonium, and alkylolammonium salts of organic sulfuric reaction products having in their molecular structure an alkyl group containing from about 8 to about 22 carbon atoms and a sulfuric acid ester group. Examples of this group of synthetic detergents are the sodium and potassium alkyl sulfates, especially those obtained by sulfating the higher alcohols ($C_8$–$C_{18}$ carbon atoms) produced by reducing the glycerides of tallow or coconut oil.

Preferred water-soluble organic detergent compounds herein include alkyl benzene sulfonates (preferably essentially linear although "hard" ABS may be used) containing from about 9 to 15 carbon atoms in the alkyl group. Examples of the above are sodium and potassium alkyl benzene sulfonates in which the alkyl group contains from about 11 to about 13 carbon atoms, in straight chain or branched chain configuration, e.g., those of the type described in U.S. Pat. Nos. 2,220,099 and 2,477,383. Especially valuable are straight chain alkyl benzene sulfonates in which the average of the alkyl groups is about 11.2 carbon atoms, abbreviated as $C_{11.2}$LAS.

Another useful detergent compound herein includes the water-soluble salts of esters of $\alpha$-sulfonated fatty acids containing from about 6 to 20 carbon atoms in the fatty acid group and their esters from about 1 to 14 carbon atoms in the alcohol radical.

Preferred "olefin sulfonate" detergent mixtures utilizable herein comprise olefin sulfonates containing from about 10 to about 24 carbon atoms. Such materials can be produced by sulfonation of $\alpha$-olefins by means of uncomplexed sulfur trioxide followed by neutralization under conditions such that any sultones present are hydrolyzed to the corresponding hydroxyalkane sulfonates. The $\alpha$-olefin starting materials preferably have from 14 to 16 carbon atoms. Said preferred $\alpha$-olefin sulfonates are described in U.S. Pat. No. 3,332,880, incorporated herein by reference.

The paraffin sulfonates embraced in the present invention are essentially linear and contain from 8 to 24 carbon atoms, preferably 12 to 20 and more preferably 15 carbon atoms in the alkyl radical.

Other anionic detergent compounds herein include the sodium alkyl glyceryl ether sulfates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing about 1 to about 10 units of ethylene oxide per molecule and wherein the alkyl groups contain about 8 to about 12 carbon atoms.

Water-soluble salts of the higher fatty acids, i.e. "soaps", are useful as the detergent component of the composition herein. This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e. sodium or potassium tallow and coconut soap.

Water-soluble nonionic synthetic detergents are also useful as the detergent component of the instant composition. Such nonionic detergent materials can be broadly defined as compounds produced by the condensation of alkylene oxide groups (hydrophilic in nature) with an organic hydrophobic compound, which may be aliphatic or alkyl aromatic in nature. The length of the polyoxalkylene group which is condensed with any particular hydrophobic group can be readily adjusted to yield a water-soluble compound having the desired degree of balance between hydrophilic and hydrophobic elements.

For example, a well-known class of nonionic synthetic detergents is made available on the market under the trade name "Pluronic" sold by Wyandotte Chemicals. These compounds are formed by condensing ethylene oxide with a hydrophobic base formed by the condensation of propylene oxide with propylene glycol. Other suitable nonionic synthetic detergents include the polyethylene oxide condensates of alkyl phenols, e.g. the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol.

The water-soluble condensation products of aliphatic alcohols having from 8 to 22 carbon atoms, in either straight chain or branched configuration, with ethylene oxide, e.g. a coconut alcohol-ethylene oxide condensate having from 5 to 30 moles of ethylene oxide per mole of coconut alcohol fraction having from 10 to 14 carbon atoms, are also useful nonionic detergents herein. Additional nonionics useful herein include those listed in U.S. patent application Ser. No. 453,464 to Collins filed Mar. 21, 1974 and in U.S. patent application Ser. No. 570,940 filed Apr. 22, 1975 entitled DETERGENT COMPOSITION to LaGasse et al (Attorney's Docket E8AMR) incorporated by reference.

Semi-polar nonionic detergents include water-soluble amine oxides containing one alkyl moiety of from about 10 to 28 carbon atoms and 2 moieties selected from the group consisting of alkyl groups and hydroxyalkyl groups containing from 1 to about 3 carbon atoms; water-soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water-soluble sulfoxide detergents containing one alkyl moiety of from about 10 to 28 carbon atoms and a moiety selected from the group consisting of alkyl and hydroxyalkyl moieties of from 1 to 3 carbon atoms.

Ampholytic detergents include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic detergents include derivatives of aliphatic quaternary ammonium, phosphonium and sulfonium compounds in which the aliphatic moieties can be straight chain or branched, and wherein one of the aliphatic substituents contains from about 8 to 18 carbon atoms and one contains an anionic water-solubilizing group. Further use of zwitterionic detergents are discussed in U.S. patent application Ser. Nos. 493,952 and 493,953 to Laughlin et al. filed Aug. 1, 1974 incorporated by reference.

Other useful detergents include water-soluble salts of 2-acyloxy-alkane-1-sulfonic acids containing from about 2 to 9 carbon atoms in the acyl group and from about 9 to about 23 carbon atoms in the alkane moiety; $\alpha$-alkyloxy alkane sulfonates containing from about 1 to 3 carbon atoms in the alkyl group and from about 8 to 20 carbon atoms in the alkane moiety; alkyl dimethyl amine oxides wherein the alkyl group contains from about 11 to 16 carbon atoms; alkyl-dimethyl-ammonio-propane-sulfonates and alkyl-dimethyl-ammonio-hydroxy-propane-sulfonates wherein the alkyl group in both types contains from about 14 to 18 carbon atoms; soaps as hereinabove defined; the condensation product of tallow fatty alcohol with about 11 moles of ethylene oxide; the condensation product of a $C_{13}$ (avg.) secondary alcohol with 9 moles of ethylene oxide; and alkyl glyceral ether sulfates with from 10 to 18 carbon atoms in the alkyl radical.

A typical listing of the classes and species of detergent compounds useful herein appear in U.S. Pat. No. 3,852,211 to Ohren issued Dec. 3, 1974, incorporated herein by reference. The foregoing list of detergent compounds and mixtures which can be used in the instant compositions is representative of such materials, but is not intended to be limiting.

A particularly useful anionic detergent mixture comprises:

i. from about 2% to about 15% by weight of an alkyl sulfate wherein the alkyl radical has from 10 to 20 carbon atoms and mixtures thereof the cation being an alkali metal preferably sodium;

ii. from about 2% to about 15% by weight of an alkyl benzene sulfonate having from 9 to 15 carbon atoms in the alkyl radical and mixtures thereof the cation being an alkali metal preferably sodium.

An additional component which may be added to (i) and Oii) above is:

iii. from about 2% to about 15% by weight of an alkyl ethoxy sulfate having from 10 to 20 carbon atoms in the alkyl radical and from 1 to 30 ethoxy groups and mixtures thereof having an alkali metal preferably sodium cation.

The detergent is present in the aqueous slurry at levels of about 1% to about 40%, preferably from about 5% to about 25% by weight.

E. Moisture Content

The moisture content of the spray-dried granules of the present invention goes to the heart of meeting the stated objectives herein. The amount of moisture remaining in the granules immediately following the spray-drying operation is indicative of the degree of polymerization of the alkali metal silicate. While the mechanism of polymerization of the alkali metal silicate is not fully understood it is recognized that the polymerization of the silicate is necessary to achieve the precipitation of the alkali metal phosphate as the calcium salt. Thus it is necessary that the product be as dry as possible to achieve the requisite calcium precipitation.

The moisture content of the product is also important from a cleaning performance standpoint as overdrying the aluminosilicate diminishes performance. From the foregoing it can be seen that the drying and performance characteristics of the alkali metal phosphate and the aluminosilicate are antagonistic. Otherwise stated the overdrying will benefit the calcium depletion via phosphate precipitation but does so at the loss of effectiveness of the aluminosilicate. It has also been observed that the reverse it true where the product is dried to a high moisture content. In this latter situation the aluminosilicate is fully effective, but the silicate has not been dehydrated leading to overall performance loss because the phosphate is not as effective in controlling calcium. If the countervailing effects on performance by the moisture content was the only item to be considered the task would be simplified. However, the moisture content of the spray-dried granules is also reflective of caking, the level of deposition on fabrics, and the ability of the product to flow freely from an open carton.

The moisture content of the spray-dried granules involves three figures. The first of the three figures is the true anhydrous state of the spray-dried granules, wherein all forms of moisture have been totally removed from the product. The second and third figures concerning the moisture content are the bound moisture and the free moisture in the spray-dried product. The bound moisture is that water associated with the granules which is physically or chemically bound to such an extent that it will not be driven off except by extraordinary heat and/or pressure conditions. The bound moisture includes about one-half of the weight of the hydrate associated with the aluminosilicate. The free moisture content is the moisture content of the product following spray drying which can be driven off by moderate heating and/or pressure conditions. Thus the total moisture in the spray-dried granules is the sum of the free moisture and the bound moisture.

The free moisture content of the spray-dried granules is from about 3.5% to about 7%, preferably from about 4.5% to about 6.5%, most preferably from greater than about 5% to about 6% by weight.

It is therefore the free moisture content of the spray-dried granule that is determinative of the degree of polymerization of the alkali metal silicate, the anhydrous state of phosphate, the ion exchange capacity of the aluminosilicate and also of the interaction of the aluminosilicate with other components the latter causing the insolubles deposition upon the laundered fabrics. Additionally, the free moisture content of the product is also determinative of granule caking and the free flow properties of the product. The free moisture content of the product may increase after drying without a substantial loss in cleaning performance.

The free moisture content of the spray-dried granules of the present invention is determined by boiling distillation. The boiling distillation or B.D. method is carried out by weighing a sample of the spray-dried granules and placing these granules in a round bottomed flask of sufficient capacity. An inert distillation fluid such as kerosene, toluene, xylene or the like is added to the round bottom flask. The granules and distillation fluid are then heated to a temperature of between 190° and 200° C and refluxed through a water cooled condenser. The volatile materials which are evaporated from the granules are then collected in a graduated container. The test method is most conveniently carried out by using a side arm condenser wherein the side arm is the graduated container. In utilizing this apparatus the test is conducted such that none of the gaseous vapors are exposed to the atmosphere. If desired some of the distillation fluid may be placed directly in the graduated side arm.

The amount of volatile materials in the spray-dried granules will upon heating to the requisite temperature be driven into the distillation column and are collected in the graduated side arm of the condenser. As the moisture is immiscible in and heavier than distillation fluid it will collect in the bottom of the graduated side arm. Any bubbles in the graduated side arm may be removed by agitation with a thin piece of nonreactive wire.

The moisture determination is made after a sufficient period of heating to ensure that no more moisture can be driven off the granules at the stated conditions. The water which is collected in the graduated side arm is measured for volume. This volumetric measurement is then converted through its density factor to a given weight of water. The free moisture content of the product is thus determined and reported as percent by weight of the spray-dried granular sample.

If there are volatile materials which are miscible in water, the test is modified. This modification involves removing the aqueous phase from the graduated side arm and determining the moisture content by any convenient means such as the Karl Fischer method.

The examples which follow have the free moisture content determined by weighing a 25 gram sample of the spray-dried granules into a 500 m.. round bottom flask. The distillation fluid added to the round bottom flask is 250 ml. of toluene. While it is preferred that the toluene is anhydrous it is possible that some moisture will be present in the toluene. If this is the case the amount of moisture in the toluene may also be determined before and after the distillation by using the Karl Fischer method.

Additional Components

It is to be understood that the spray-dried granular compositions of the present invention may be supplemented by all manner of detergent components, either by including such components in the aqueous slurry to be dried or by admixing such components with the composition of the invention following the drying step. Soil suspending agents at about 0.1 to 10% by weight such as water-soluble salts of carboxymethylcellulose, carboxyhydroxymethylcellulose copolymers of vinyl ether and maleic anhydride and preferably polyethylene glycols having a molecular weight of about 400 to 10,000 are common components of the present invention. Dyes, pigments, optical brighteners, and perfumes can be added in varying amounts as desired. Suitable bleaches herein include percarbonates, perborates, and activators therefor. Sodium sulfate is a desirable ingredient in the spray-dried granules at from about 5% to about 60% by weight of the composition. Sodium sulfate provides proper granule density and aids in forming crisp granules.

Additional components which are desirable in the present invention are whiteness maintenance additives. In particular glassy phosphates at levels of from about 0.1% to 4% having the formula $$(M_2O)_x(P_2O_5)_y$$

wherein M is an alkali metal, preferably sodium; $y$ having a value of from about 5 to 50, preferably 7 to 25 with the ratio of $y$:$x$ from about 1:1 to about 1:1.5 are useful in the present invention for whiteness maintenance.

Preferred values of $y$ above are such that there are 10, 14, and 21, most preferably 14 and 21 phosphorous atoms in the compound. A more preferred range of glassy phosphate is from about 0.5% to about 2.5% by weight, most preferably from about 1.0% to about 2% by weight of the finished product. Alternatively the formula of the glassy phosphates can be expressed as $M_{2y} + {}_2P_y\ O_{6y} + {}_1$ wherein M is an alkali metal and $y$ varies from 7 to 12.

Other materials such as fluorescers, antiseptics, germicides, enzymes in minor amounts, anti-caking agents such as sodium sulfosuccinate, and sodium benzoate may also be added. Enzymes suitable for use herein include those discussed in U.S. Pat. Nos. 3,519,570 and 3,553,139 to McCarty and McCarty et al. issued July 7, 1970 and Jan. 5, 1971, respectively, incorporated herein by reference.

Additional amounts of water-soluble detergency builders may be added to the detergent compositions of the present invention. Such inorganic detergency builder salts include alkali metal carbonates, borates, and bicarbonates. Specific examples of such salts are the sodium and potassium borates, perborates, bicarbonates, and carbonates.

Examples of suitable organic detergency builder salts are (1) water-soluble aminopolycarboxylates, e.g. sodium and potassium ethylenediaminetetraacetates, nitrilotriacetates and N-(2-hydroxyethyl)-nitrilodiacetates; (2) water-soluble salts of phytic acid, e.g. sodium and potassium phytates — see U.S. Pat. No. 2,739,942; (3) water-soluble polyphosphonates, including specifically, sodium, potassium and lithium salts of ethane-1-hydroxy-1,1-diphosphonic acid, sodium, potassium and lithium salts of methylene diphosphonic acid, sodium, potassium and lithium salts of ethylene diphosphonic acid, and sodium, potassium and lithium salts of ethane-1,1,2-triphosphonic acid. Other examples include the alkali metal salts of ethane-2-carboxy-1,1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3,-tetraphosphonic acid, propane-1,1,2,3-tetraphosphonic acid, and propane-1,2,2,3-tetraphosphonic acid; and (4) water-soluble salts of polycarboxylate polymers and copolymers as described in U.S. Pat. No. 3,308,067.

A useful detergent builder which may be employed in the present invention comprises a water-soluble salt of a polymeric aliphatic polycarboxylic acid having the following structural relationships as to the position of the carboxylate groups and possessing the following prescribed physical characteristics: (a) a minimum molecular weight of about 350 calculated as to the acid form; (b) an equivalent weight of about 50 to about 80 calculated as to acid form; (c) at least 45 mole percent of the monomeric species having at least two carboxyl radicals separated from each other by not more than two carbon atoms; (d) the site of attachment of the polymer chain of any carboxyl-containing radical being separated by not more than 3 carbon atoms along the polymer chain from the site of attachment of the next carboxyl-containing radical. Specific examples of the above-described builders include polymers of itaconic acid, aconitic acid, maleic acid, mesaconic acid, fumaric acid, methylene malonic acid and citraconic acid and copolymers with themselves.

In addition, other builders which can be used satisfactorily include water-soluble salts of mellitic acid, citric acid, pyromellitic acid, benzene pentacarboxylic acid, oxydiacetic acid, carboxymethyloxysuccinic acid, and oxydisuccinic acid, preferably the sodium salts thereof.

The detergent compositions of this invention preferably contain the water-soluble detergent in a ratio to the total builder present in a weight ratio of from about 10:1 to about 1:10, preferably from about 3:1 to about 1:3. The amount of additional builder in the detergent compositions of the present invention is from about 3% to about 25%, preferably from about 10% to about 20%. These additional builders may be dried with the aqueous slurry or admixed with the dried product of the slurry.

COMPOSITION, PREPARATION AND UTILIZATION

The spray-dried granules with the present invention, are prepared by forming an aqueous slurry of the components and then spraying this slurry (crutcher mix) in conventional drying towers to the requisite moisture content. The amount of water in the aqueous slurry should be from about 20% to about 95% by weight and preferably from about 25% to about 50% by weight of the total composition of the slurry. The amount of water actually included in the slurry should be sufficient to allow the slurry to be pumped to the spray drying tower, but should not be so great as to require an undue amount of energy in the drying process.

The order of addition of the components to the crutcher mix is as follows for anionic detergent products. The first component which is added to the crutcher is the neutralized paste comprising the anionic surfactant, preferably the sodium salt thereof, a small amount of free caustic or other neutralizing agent, and an amount of the salt corresponding to the cation of the neutralizing agent and the excess anionic moiety of the detergent acid, i.e. sodium sulfate wherein caustic is used to neutralize excess free sulfuric acid which was used to sulfate or sulfonate the detergent. The second component added to the crutcher is an aqueous mixture of the alkali metal silicate. The remaining components to be added respectively are the alkali metal phosphate, and the aluminosilicate. It is emphasized that the order of addition of the components merely facilitates processing under existing plant conditions and is not intended to be limiting. Additional materials may be added to the crutcher mix such as sodium sulfate.

The slurry described above is thoroughly mixed in the crutcher and pumped to a spray-drying tower. The drying tower utilized in the present invention may employ either countercurrent or cocurrent drying gas flow. The distinction between the types of drying towers is that in a counter-current operation the drying gas flows in an opposite direction to the path of the granules. In a cocurrent operation, both the drying gas and the granules travel in the same direction. The preferred method of forming the spray-dried granules of the present invention is described in U.S. Pat. Nos. 3,629,951 and 3,629,955, both of which were issued to Robert P. Davis et al. on Dec. 28, 1971, both of which are herein incorporated by reference.

The drying gas employed in the spray drying operation is a mixture of hot air and the by-products of the combustion of natural gas. The inlet temperature of this gaseous mixture ranges from about 200° F to about 750° F. Under the process described in the Davis et al. patents, supra, the temperature which the granules reach varies from about 120° F to about 300° F, preferably from about 150° F to about 250° F.

If nonionic detergents are to be included in the composition, it is desirable to spray them onto the granules following the drying operation to avoid decomposition of the nonionic in the spray drying tower.

The spray dried granules of the present invention are used in a conventional manner for cleaning laundry products. Under U.S. washing conditions, the spray dried granules of the present invention are typically used in a concentration of from about 0.5% to about 0.15% by weight of the aqueous wash solution. Typical U.S. washing machines use from about 10–17 gallons of water and the per cup usage of the spray dried granules is therefore from about one half of a cup to about one and one-half cups per load of laundry. Under U.S. washing conditions, the temperature of the water in the wash cycle is maintained between about 70° F to about 130° F. Under European washing conditions, the product concentration in the wash solution is often as high as 0.5% by weight and the wash temperature is between 90° and 100° C.

TEST METHODS

The following standarized tests are used to determine the efficiency of detergent compositions.

Cleaning performance is determined by soiling fabric swatches with clay. The soiled fabric swatches are then washed with the test product at a concentration of 0.12% by weight in a washing machine at 100° F. The water hardness is set at any convenient level typically 7–11 grams per gallon as calcium carbonate. The water hardness itself is a mixture of calcium and magnesium in a respective weight ratio of 3:1. The wash cycle is 10 minutes.

Following the wash cycle the fabric swatches are measured for cleaning in Hunter Whiteness Units using a Hunter whiteness meter.

The fabric swatches used are Dacron and Dacron/-cotton and cotton. The purpose of the cleaning test in the present invention is to show the efficiency of the present composition in cleaning fabrics which are sensitive to clay soil removal in the presence of water hardness.

The level of insolubles which are deposited upon the fabrics mainly by the interaction of the alkali metal silicate and the aluminosilicate is determined by a modified black fabric deposition test (MBFDT). The MBFDT is determined by adding a weighed sample of the detergent product to a given volume of water and agitating the mixture. This slurry is then filtered through a dark knit fabric swatch. After the slurry is passed through the swatch the fabric is compared with standard photogrpahs of fabric swatches which have the insoluble residues thereon and graded on a scale of from 1 to 10, 1 represents extremely heavy deposition and 10 represents virtually no deposition on the fabric.

More particularly, the MBFDT is run by weighing out a sample of 0.36 grams of product and adding that sample to 350 milliliters of water containing 7 grains of hardness as previously defined. The temperature of the water is 70° F. The flask containing the water and the sample is then agitated by a Burrell shaker which is set at the 5° setting and run for 10 minutes to dissolve the sample.

The black fabric swatch is wetted and clamped to a funnel between the base and the top thereof. To ensure uniformity of the test the fabric is not stretched during the clamping operation. The flask containing the sample and the water are swirled for a few seconds and 175 milliliters of the mixture discarded. The remaining 175 milliliters is slowly poured through the fabric swatch. The flask is then rinsed with 100 milliliters of 7 grain 70° water which is also poured through the fabric.

The fabric is then removed from the funnel and folded in half and then in thirds at a 90° angle of the original fold followed by folding the fabric sample again in thirds in the direction of the initial fold. The fabric is then rinsed in its folded condition and again squeezed gently to eliminate the excess water. The fabric is then unfolded and spread on a clean surface and allowed to dry. The dried fabric is then graded as previously discussed. A fabric which receives a grade of 4 or less is reported as poor.

The products of the present invention are also tested for their caking tendencies. As the product of the present invention is in the form of spray-dried granules, it is desired that the products stay in this form throughout its use life. If the product has a tendency to cake during storage it will be undesirable to the consumer. From a more practical standpoint a product which has a high tendency to cake during storage will flow unevenly in the form of large lumps and will either be under used or over used in the washing machine. The caking tendency is most pronounced in humid areas of the country where severe caking can leave the product in a state where it cannot be removed from the carton without manual agitation.

The caking test is carried out by placing a sample of the product on a base plexiglas piston head within a plexiglas cylinder. The amount of the sample is 150 grams. A second piston which is a 20 pound weight is then lowered vertically onto the product sample such that both pistons are in the vertical position. The 20 pound weight from the second piston is maintained on the sample for 60 seconds. The weighted piston is then slowly raised and the plexiglas cylinder is then carefully removed from the base piston so that the cake of compressed granules is not disturbed.

The compressed granules are then subjected to incremental force by hand until the compressed granules crumble. The amount of force required to crumble the cake of the compressed granule will range from 0 to 20 inch pounds. The lower figure of 0 indicates that the spray-dried granules have no tendency to cake in the carton while the 20 inch pound figure indicates an extreme tendency toward caking in the carton.

The spray-dried granules of the present invention are next tested for their ability to be poured from the carton after being exposed to a constant temperature and humidity over a period of several days. This test and variations thereof are fully described in the U.S. Pat. No. 3,932,316, issued to Sagel and Weber, issued Jan. 13, 1967, which is herein incorporated by reference.

The following are examples of the present invention:

EXAMPLE I

Compositions A and B are prepared by spray drying:

| A | | B |
|---|---|---|
| 7% | sodium salt of $C_{11.8}$ alkyl* benzene sulfonate | 7% |
| 5.5 | sodium tallow alcohol sulfate | 5.5 |
| 5.5 | sodium triethoxylated $C_{14}$–$C_{16}$ alkyl sulfate | 5.5 |
| 10.0 | sodium silicate ($Na_2O$:$SiO_2$ 1:3.2) | — |
| — | sodium silicate ($Na_2O$:$SiO_2$ 1:2.4) | 10.1 |
| 12.89 | sodium pyrophosphate | — |
| — | sodium tripolyphosphate | 24.4 |
| 37 | sodium sulfate | 41 |
| 15 | $Na_{12}[AlO_2 \cdot SiO_2]_{12} \cdot 27H_2O$ (on a dry weight basis) | — |
| 5% | free moisture | 6 |
| | minors balance | |

*In the examples alkyl chain lengths are denominated as an average thus $C_{11.8}$ indicates a mixture of alkyl benzene sulfonates having a mean of 11.8 carbon atoms.

*In the examples alkyl chain lengths are denominated as an average thus $C_{11.8}$ indicates a mixture of alkyl benzene sulfonates having a means of 11.8 carbon atoms.

The above described products are tested for cleaning as previously described with the following results in Hunter Whiteness Units (HWU) at 0.12% by weight in 100° F water.

| | A | B |
|---|---|---|
| 7 grains | 35 HWU | 6.7 HWU |
| 9 grains | 15.3 HWU | 2.9 HWU |

The compositions of the present invention (A) clean better than a similar composition (B) which contains more than twice as much elemental phosphorous.

EXAMPLE II

Compositions C, D, E, and F are prepared by spray-drying:

| | C | D | E | F |
|---|---|---|---|---|
| Sodium salt of $C_{11.8}$ alkyl benzene sulfonate | 7 | 7 | 7 | 7 |
| sodium tallow alcohol sulfate | 5.5 | 5.5 | 5.5 | 5.5 |
| Sodium triethoxylated $C_{14}$–$C_{16}$ alkyl sulfate | 5.5 | 5.5 | 5.5 | 5.5 |
| Sodium silicate ($Na_2O$:$SiO_2$ 1:3.2) | 10 | 10 | 8 | — |
| Sodium silicate ($Na_2O$:$SiO_2$ 1:2.58) | — | — | — | 10.6 |
| Sodium pyrophosphate | 13 | 13 | 13 | 13 |
| Sodium sulfate | 37 | 39 | 41 | 37 |
| $Na_{12}[AlO_2 \cdot SiO_2]_{12} \cdot 27H_2O$ (on a dry weight basis) | 15 | 15 | 15 | 15 |
| Free moisture | 5.7 | 3.5 | 3.9 | 5.4 |
| Minors balance | | | | |

The following cleaning performance, cake grade and MBFDT grades are observed for products C, D, E, and F:

| | C | D | E | F |
|---|---|---|---|---|
| HWU at 7 grains, 100° F water using 0.12% product concentration | 37 | 47 | 47 | 52 |
| Cake grade | 9.8 | 3.5 | 12.7 | 10.4 |
| MBFDT | 6 | 5 | 6.5 | 6.5 |

The above examples indicate the varied relation of cleaning performance, cake grades and insolubles deposition (MBFDT).

These products C–F are superior to product B in cleaning and equivalent in caking. Products C–F are equivalent or better in pour grades than product B Example II may be modified by varying the sodium sulfate and:

1. increasing the phosphate content to 35%;
2. increasing the aluminosilicate to 25%;
3. decreasing the phosphate content to 5%;
4. substituting sodium orthophosphate for the pyrophosphate
5. decreasing the aluminosilicate content to 3% on a dry weight basis;
6. drying the product 7.0% moisture;
7. changing the silicate ratio to 2.0 and then 4.0.

What is claimed is:

1. A spray-dried granular detergent product comprising:

a. from about 1% to about 40% by weight of an organic detergent component selected from the group consisting of anionic, nonionic, zwitterionic, and ampholytic detergents and mixtures thereof;

b. from about 3% to about 25% by weight of a water insoluble crystalling aluminoslicate ion exchange material of the formula $$Na_{12}[AlO_2 \cdot SiO_2]_{12} \cdot x\ H_2O$$

wherein $x$ is an integer of from about 20 to about 30, said aluminosilicate having a particle size range of from about 0.2 micron to about 10 microns, having a calcium ion exchange capacity of at least about 200 mg. eq. $CaCO_3$/g. and an ion exchange rate with calcium of at least about 2 grains of calcium ion per gallon per minute per gram;

c. from about 5% by weight of alkali metal pyrophosphate;

d. from about 7% to about 25% by weight of an alkali metal silicate having the weight ratio $SiO_2$:$M_2O$ of from about 2.0:1 to about 4.0:1 wherein M is sodium metal;

said product having a total free moisture content of from about 4.5% to about 7% by weight of the composition.

2. The composition of claim 1 wherein the alkali metal pyrophosphate is the sodium salt thereof.

3. The composition of claim 2 wherein the detergent component is anionic.

4. The composition of claim 3 wherein the alkali metal pyrophosphate is present at from about 10% to about 25% by weight.

5. The composition of claim 4 additionally comprising from about 5% to about 25% by weight of an alkali metal carbonate.

6. The composition of claim 4 wherein the free moisture content is from about 4.5% to about 6.5% by weight of the composition.

7. The composition of claim 6 wherein the alkali metal silicate is present at from about 7% to about 15% by weight.

8. The composition of claim 7 wherein the anionic detergent is selected from the group consisting of alkyl benzene sulfonates, alkyl ethoxy sulfates, and alkyl sulfates and mixtures thereof.

9. The composition of claim 8 wherein the aluminosilicate is present at from about 10% to about 20% by weight.

10. The composition of claim 9 wherein the silicate ratio is from about 2.4:1 to about 3.75:1.

11. The composition of claim 10 wherein the anionic detergent component is a mixture comprising:

a. from about 2% to about 15% by weight of an alkyl benzene sulfonate;

b. from about 2% to about 15% by weight of an alkyl ethoxy sulfate; and c. from about 2% to about 15% by weight of an alkyl sulfate.

12. The composition of claim 5 wherein the alkali metal carbonate is the sodium salt thereof.

13. The composition of claim 4 additionally comprising from about 3% to about 25% by weight of a member selected from the group consisting of the alkali metal citrates and the acid salts thereof.

14. The composition of claim 4 additionally comprising from about 0.1% to about 4% by weight of a glassy phosphate of the formula $$(M_2O)_x\ (P_2O_5)_y$$

wherein $y$ is from about 5 to 50 and the weight ratio of $y$:$x$ is from about 1:1 to about 1:1.5.

15. The composition of claim 4 additionally comrising from about 0.1% to about 10% by weight of a polyethylene glycol soil suspending agent having a molecuolar weight of from about 400 to about 10,000.

16. The composition of claim 4 wherein the weight ratio of the phosphate builder to the aluminosilicate is less than about 1:1.

* * * * *

UNITED STATES PATENT AND TRADEMARK OFFICE

CERTIFICATE OF CORRECTION

PATENT NO. : 4,019,999

DATED : April 26, 1977

INVENTOR(S) : Tom H. Ohren, Gary W. Kingry

It is certified that error appears in the above-identified patent and that said Letters Patent are hereby corrected as shown below:

Column 1, Line 58, after "Krummel et al", insert -- are --.

Column 1, line 61, "587,445" should be -- 487,455 --.

Column 3, line 7, "the metal" should be -- the alkali metal --.

Column 4, line 33, after "phosphate", insert -- salt --.

Column 10, line 15, after "more preferably", insert -- 14 to 18 --.

Column 11, line 8, "E8AMR" should be -- E84AMR --.

Column 11, line 44, "α-alkyloxy should be -- β-alkyloxy --.

Column 12, line 41, "it" should be -- is --.

Column 13, line 63, "500 m" should be -- 500 ml --.

Column 15, line 10, "1,1,3,3,-tetraphosphonic" should be -- 1,1,3,3-tetraphosphonic --.

Column 16, line 6, "wherein" should be -- where --.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE

CERTIFICATE OF CORRECTION

PATENT NO. : 4,019,999

DATED : April 26, 1977

INVENTOR(S) : Tom H. Ohren, Gary W. Kingry

It is certified that error appears in the above-identified patent and that said Letters Patent are hereby corrected as shown below:

Column 17, line 1, "grams" should be -- grains --.

Column 18, delete line 51-54.

Column 19, line 59, "crystalling" should be -- crystalline --.

Column 20, line 4, after "5%" insert -- to about 35% --.

Column 20, line 62, "molecuolar" should be -- molecular --.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*